United States Patent
O'Neil et al.

(10) Patent No.: US 8,140,414 B2
(45) Date of Patent: Mar. 20, 2012

(54) SYSTEM AND METHOD FOR CONTROLLING A UTILITY METER

(75) Inventors: Adrian O'Neil, Madison, AL (US); Benjamin Harbin, Madison, AL (US)

(73) Assignee: Carina Technology, Inc., Huntsville, AL (US)

( * ) Notice: Subject to any disclaimer, the term of this patent is extended or adjusted under 35 U.S.C. 154(b) by 0 days.

(21) Appl. No.: 11/824,131

(22) Filed: Jun. 29, 2007

(65) Prior Publication Data

US 2008/0086394 A1    Apr. 10, 2008

Related U.S. Application Data (60) Provisional application No. 60/817,487, filed on Jun. 29, 2006.

(51) Int. Cl.
| | |
|---|---|
| G07F 19/00 | (2006.01) |
| H04M 15/00 | (2006.01) |
| G01R 11/56 | (2006.01) |
| G01R 21/133 | (2006.01) |
| G06F 17/00 | (2006.01) |
| G08B 23/00 | (2006.01) |
| G08C 15/06 | (2006.01) |
| G08C 19/20 | (2006.01) |

(52) U.S. Cl. ............. 705/34; 705/412; 340/870.02; 340/870.03

(58) Field of Classification Search .......... 705/34, 705/412; 340/870.02, 870.03

See application file for complete search history.

(56) References Cited

U.S. PATENT DOCUMENTS

| | | | |
|---|---|---|---|
| 4,023,043 A | 5/1977 | Stevenson | 307/38 |
| 4,419,667 A | 12/1983 | Burr et al. | 340/825.06 |
| 4,482,964 A * | 11/1984 | Berstein et al. | 700/283 |
| 4,587,417 A | 5/1986 | Duve et al. | |
| 4,766,331 A | 8/1988 | Flegel et al. | |
| 4,804,957 A * | 2/1989 | Selph et al. | 340/870.03 |
| 4,940,976 A * | 7/1990 | Gastouniotis et al. | 340/870.02 |
| 5,214,587 A * | 5/1993 | Green | 702/60 |
| 5,214,793 A | 5/1993 | Conway et al. | |
| 5,381,462 A * | 1/1995 | Larson et al. | 379/106.06 |
| 5,502,339 A | 3/1996 | Hartig | 307/31 |
| 5,684,965 A * | 11/1997 | Pickering | 705/34 |
| 5,696,695 A | 12/1997 | Ehlers et al. | 364/492 |
| 5,699,276 A * | 12/1997 | Roos | 379/106.03 |
| 5,767,790 A * | 6/1998 | Jovellana | 340/870.02 |
| 5,897,607 A * | 4/1999 | Jenney et al. | 702/62 |
| 5,968,393 A | 10/1999 | Demaline | 219/492 |
| 5,995,601 A * | 11/1999 | Garland et al. | 379/106.03 |
| 6,043,642 A * | 3/2000 | Martin et al. | 324/142 |

(Continued)

OTHER PUBLICATIONS

Correcting and Replacing FPL, Business wire, p. 5324, Jul. 7, 2003.*

(Continued)

*Primary Examiner* — Matthew Gart
*Assistant Examiner* — Harshad Parikh
(74) *Attorney, Agent, or Firm* — James Richards (57) ABSTRACT

A system and method for monitoring and controlling utility meters is provided. A collar communicatively connected to the utility meter monitors power usage and provides usage data, power quality data, and other data to the utility and the customer. The system provides for pre-pay power, and the collar relay can automatically connect or disconnect power to a customer as required. The system provides intelligent remote control of utility meters via wireless or other communications means.

33 Claims, 9 Drawing Sheets

U.S. PATENT DOCUMENTS

| | | | |
|---|---|---|---|
| 6,067,052 A * | 5/2000 | Rawles et al. | 343/741 |
| 6,124,800 A | 9/2000 | Beard et al. | |
| 6,208,266 B1 * | 3/2001 | Lyons et al. | 340/870.02 |
| 6,265,699 B1 | 7/2001 | Scott | 219/483 |
| 6,293,471 B1 | 9/2001 | Stettin et al. | 236/20 R |
| 6,350,967 B1 | 2/2002 | Scott | 219/497 |
| 6,375,087 B1 | 4/2002 | Day et al. | 237/8 A |
| 6,424,270 B1 * | 7/2002 | Ali | 340/870.02 |
| 6,465,764 B1 | 10/2002 | Shahin | 219/486 |
| 6,560,409 B2 | 5/2003 | Troost, IV | 392/498 |
| 6,649,881 B2 | 11/2003 | Scott et al. | 219/492 |
| 6,737,983 B1 | 5/2004 | Temple | |
| 6,785,466 B1 | 8/2004 | Jackson et al. | 392/454 |
| 6,795,644 B2 | 9/2004 | Bradenbaugh | 392/463 |
| 6,819,292 B2 * | 11/2004 | Winter | 343/702 |
| 6,859,742 B2 * | 2/2005 | Randall et al. | 702/61 |
| 6,955,301 B2 | 10/2005 | Munsterhuis et al. | 236/20 R |
| 6,957,058 B2 * | 10/2005 | Chan et al. | 455/406 |
| 6,961,641 B1 | 11/2005 | Forth et al. | |
| 6,965,303 B2 | 11/2005 | Mollenkopf | |
| 6,980,973 B1 * | 12/2005 | Karpenko | 705/412 |
| 6,989,514 B2 | 1/2006 | Patterson et al. | 219/492 |
| 6,993,417 B2 | 1/2006 | Osann, Jr. | |
| 7,010,363 B2 | 3/2006 | Donnelly et al. | 700/19 |
| 7,043,459 B2 * | 5/2006 | Peevey | 705/412 |
| 7,064,679 B2 * | 6/2006 | Ehrke et al. | 340/870.02 |
| 7,065,431 B2 | 6/2006 | Patterson et al. | 700/299 |
| 7,075,414 B2 | 7/2006 | Giannini et al. | |
| 7,098,783 B2 * | 8/2006 | Crichlow | 340/531 |
| 7,117,825 B2 | 10/2006 | Phillips | 122/4 A |
| 7,230,544 B2 * | 6/2007 | Van Heteren | 340/870.03 |
| 7,274,305 B1 | 9/2007 | Luttrell | |
| 7,310,052 B2 * | 12/2007 | Bowman | 340/870.02 |
| 7,336,200 B2 * | 2/2008 | Osterloh et al. | 340/870.02 |
| 7,432,477 B2 | 10/2008 | Teti | 219/492 |
| 7,432,823 B2 * | 10/2008 | Soni | 340/870.02 |
| 7,453,373 B2 * | 11/2008 | Cumeralto et al. | 340/870.02 |
| 7,503,287 B2 | 3/2009 | Friedrich | 122/14.22 |
| 7,525,423 B2 | 4/2009 | Berkman et al. | 340/870.03 |
| 7,746,072 B2 * | 6/2010 | Van Helvoort et al. | 324/318 |
| 7,772,989 B2 * | 8/2010 | Ehrke et al. | 340/870.03 |
| 7,999,696 B2 * | 8/2011 | Wang et al. | 340/870.02 |
| 8,013,732 B2 * | 9/2011 | Petite et al. | 340/539.1 |
| 2001/0051933 A1 * | 12/2001 | Rowley et al. | 705/412 |
| 2002/0040355 A1 * | 4/2002 | Weiner | 705/412 |
| 2003/0009401 A1 * | 1/2003 | Ellis | 705/35 |
| 2003/0156041 A1 * | 8/2003 | Taisto et al. | 340/870.02 |
| 2003/0225713 A1 * | 12/2003 | Atkinson et al. | 705/412 |
| 2004/0075343 A1 | 4/2004 | Wareham et al. | |
| 2004/0117330 A1 | 6/2004 | Ehlers et al. | |
| 2004/0139038 A1 * | 7/2004 | Ehlers et al. | 705/412 |
| 2004/0243524 A1 * | 12/2004 | Crichlow | 705/412 |
| 2005/0021393 A1 | 1/2005 | Bao et al. | |
| 2005/0083210 A1 * | 4/2005 | Shuey et al. | 340/870.03 |
| 2005/0246295 A1 * | 11/2005 | Cameron | 705/412 |
| 2006/0031180 A1 | 2/2006 | Tamarkin et al. | |
| 2006/0069661 A1 * | 3/2006 | Scoggins et al. | 705/412 |
| 2006/0106741 A1 * | 5/2006 | Janarthanan | 705/412 |
| 2006/0129498 A1 * | 6/2006 | Baraty | 705/63 |
| 2007/0203860 A1 * | 8/2007 | Golden et al. | 705/412 |
| 2007/0205915 A1 | 9/2007 | Shuey et al. | |
| 2007/0255612 A1 * | 11/2007 | Baraty | 705/10 |
| 2008/0048883 A1 * | 2/2008 | Boaz | 340/870.02 |
| 2008/0052253 A1 * | 2/2008 | Edwards et al. | 705/412 |
| 2008/0129538 A1 * | 6/2008 | Vaswani et al. | 340/870.03 |
| 2008/0133065 A1 | 6/2008 | Cannon et al. | |
| 2008/0177678 A1 * | 7/2008 | Di Martini et al. | 705/412 |
| 2008/0191695 A1 * | 8/2008 | Van Helvoort et al. | 324/314 |
| 2008/0238710 A1 | 10/2008 | Tolnar et al. | |
| 2009/0091472 A1 * | 4/2009 | Ocondi | 340/870.03 |
| 2009/0105888 A1 | 4/2009 | Flohr et al. | |
| 2009/0157488 A1 * | 6/2009 | O'Neil et al. | 705/11 |
| 2009/0210293 A1 * | 8/2009 | Steele et al. | 705/10 |
| 2009/0326725 A1 * | 12/2009 | Carlson et al. | 700/291 |
| 2010/0145837 A1 * | 6/2010 | Graziano et al. | 705/34 |
| 2010/0174667 A1 * | 7/2010 | Vitale et al. | 705/412 |
| 2010/0174668 A1 * | 7/2010 | Finch et al. | 705/412 |
| 2010/0306033 A1 * | 12/2010 | Oved et al. | 705/10 |
| 2011/0119166 A1 * | 5/2011 | Steinberg | 705/34 |

OTHER PUBLICATIONS

Competitive edge PowerView by Coleman Andrew, V131 N20, pp. 40-43, Nov. 1, 1993.*

ONT powering options abound; Meghan Fuller, Lightwave, Tulsa Mar. 2006 vol. 23, Iss 3 pp. 17 2 pgs.*

Pepco Technologies keeps power on; Transmission & Distribution World Overland Park, May 2000, vol. 52, Iss 5; p. 18 1 pgs.*

* cited by examiner

SYSTEM AND METHOD FOR CONTROLLING A UTILITY METER

REFERENCE TO RELATED APPLICATIONS

This application claims priority to Provisional Patent Application U.S. Ser. No. 60/817,487, entitled "Ethernet Meter Device" and filed on Jun. 29, 2006, which is fully incorporated herein by reference.

FIELD OF THE INVENTION

The invention provides a long range, communication independent, collar-based, device with associated software and firmware, capable of power supply output, electric service disconnect/reconnect, limiting current, metering information, and communicating with and controlling local area network devices for provision of application functions desirable in the utility industry.

Specifically, the invention allows utility service providers the ability to obtain real time metering information via a collar-mounted device that is installed between the existing meter socket and the electric meter.

BACKGROUND OF THE INVENTION

Most utility providers measure the usage of energy or gas or water through devices called meters. These meters may be electro-mechanical or electronic or a combination of both. Most utilities obtain monthly meter readings for the purposes of rendering a bill based on the consumption measured by the meter. Obtaining meter readings can be a laborious and costly process for the utility, as historically meter reading required individuals going house to house and manually reading the meter and recording the results.

Recently, newer technologies have allowed for remote automation of the meter reading process. These technologies include public and private network communications, fixed radio frequency (RF) meter reading, meter reading over a power line carrier and even satellite meter reading. These meter reading technologies are centered on the process of obtaining a monthly meter reading, which is part of the larger system process of billing. As technology continues to expand toward increased data throughput and reducing size and cost of the required devices, expanding capabilities of meter information have emerged, resulting in changes in the way utilities think of metering information.

Previously, devices performing these automatic metering functions were required to use one specific communication methodology protocol. Most devices were only capable of one way communication, i.e., from the meter back to the utility. Existing metering technologies have focused on the measuring function of meter reading and have not considered other important aspects of the electric system networks that are dynamically occurring at the customer premise. The present invention takes advantage of the broadband technologies now available to render to the utility, and to the customer, vital information about the quality of the electric service being provided.

A disadvantage of the historical metering approach is that metering has been viewed as only the "cash register" for the utility. Hence utilities have not been focused on the benefits of communicating to the meter, and instead have targeted merely receiving information from the meter. Utilities typically render a bill to their customers monthly and the customers have no way of validating energy use unless they want to dispute the bill. With broadband technologies now available to the home, the present invention allows the utility to interrogate the electric system at the premise in near real time. This encompasses much more than meter reading or measuring voltage as historically performed, and also includes information about voltage anomalies, load profiling and estimation, and energy efficiency estimation. The present invention allows a true near-real-time diagnostic system of the electric service which now opens the door for a variety of applications to help not only the utility provide better service, but to also allow the customer for the first time to have the necessary information to help control energy consumption and improve efficiency.

SUMMARY OF THE INVENTION

The present invention is capable of communicating bi-directionally through a variety of communication platforms including, but not limited to, analog cell systems, digital cell systems, Ethernet, short range radio wireless, ZigBee, power line carrier, Hybrid-Fiber Coax, RF, WiFi, and WiMax. The system allows for the addition or substitution of other backhaul methodologies. More importantly, the present invention has reduced duplication of functionality, reduced equipment size and cost to achieve that functionality. The present invention further provides application functionality that currently does not exist, specifically the ability to read meters via Ethernet or other communications platforms and provide a power supply in the same collar device. Existing technology can read meters and store voltages for the purposes of measuring electric energy and voltage. The present invention takes that information and transforms it into intelligence for the utility and the customer.

There are many specific advantages offered by the present invention. Other meter reading devices read meter registers and voltage and transmit that information back to the utility via an Ethernet network. These devices include an Ethernet connection in the meter itself. Therefore, in order to add functionality to the devices, the existing meters must be replaced. Because the present invention is collar-based, it can be used with existing meters.

The present invention provides the utility customer access to the same, real-time information available to the utility. This capability is achieved through a customer interface unit (CIU) located in the premise that allows the customer to view metering information including: voltage current information; power quality information including voltage transients; power factor, harmonics; energy usage information; and even anticipated energy consumption, over a specified time period.

The information may be communicated wirelessly or through the power line carrier between the collar-based meter device and the internal customer display unit in a real time environment. This information includes real time kilowatt hours, voltage profile, total harmonics distortion and power factor. This information is measured over a 1 minute, 5 minute, 15 minute interval basis, or variable time basis. The voltage profile may be presented over the same time frames as well. Temperature inside the collar device is also available. The system of the present invention includes the ability to display energy consumption by appliance and provide the utility the opportunity to utilize the system for demand side management and supports a new level of energy education at the customer level.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

DETAILED DESCRIPTION

The present invention and its advantages are best understood by referring to the drawings. The elements of the drawings are not necessarily to scale, emphasis instead being placed upon clearly illustrating the principles of the invention.

Figure 1:
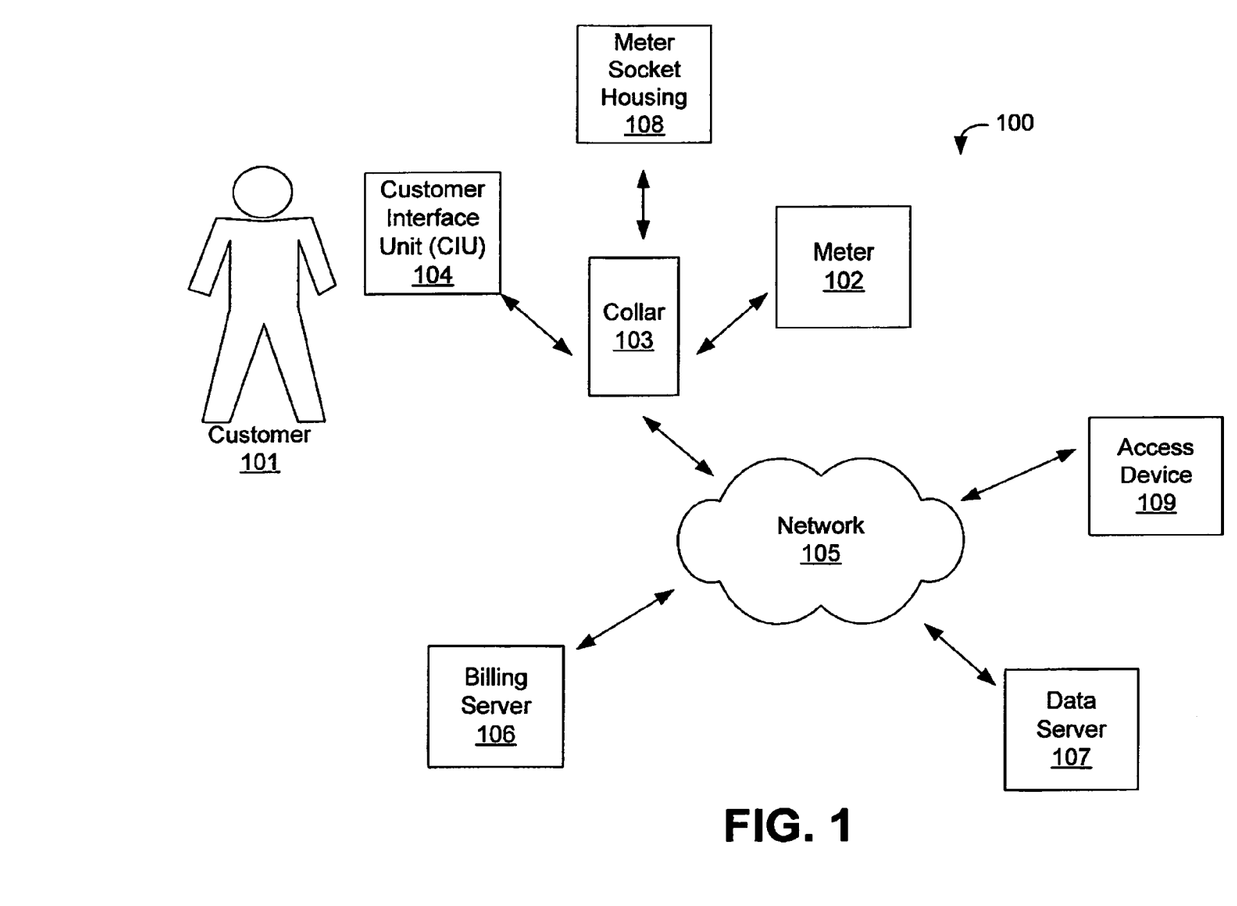
FIG. 1 is a block diagram illustrating a system in accordance with an exemplary embodiment of the present disclosure.

Embodiments of the present disclosure generally pertain to systems and methods for reading and controlling utility meters. FIG. 1 illustrates a collar-based utility meter control system 100 in accordance with an exemplary embodiment of the present disclosure. The system 100 comprises an adapter collar 103 communicating with a utility meter 102 and a customer interface unit (CIU) 104. Utility meter 102 may be of any type provided by a utility service provider, and in some embodiments is an American National Standards Industry (ANSI) C12 meter. Although this specification primarily describes a power meter, the present invention is also used for gas and water meters. Collar 103 connects between a standard utility meter socket housing 108 and utility meter 102 and communicates via a network 105 to billing server 106, data server 107, and access device 109. Customer 101 accesses CIU data 523 [FIG. 5] via the CIU 104.

Access device 109 provides user interfaces at the utility (not shown) for functions such as hardware configuration, monitoring and control, system administration, interfaces to other electronic systems, historical archiving, alarm generation and message forwarding, and report generation. Access device 109 may be any suitable computer known in the art, and in one embodiment is a "thin client" device which depends primarily on the data server 107 for processing activities, and focuses on conveying input and output between the utility user (not shown) and the data server 107.

Network 105 may be of any type network or networks known in the art, such as Ethernet, analog cellular, digital cellular, short range radio wireless, Wifi, WiMax, broadband over power line, coaxial cable, and the like. Network 105 may be any combination of hardware, software, or both.

In some embodiments of the invention, network 105 Wide Area Network (WAN) methodologies will be utilized for communicating information and control over the network 105. The type of WAN will determine whether a Local Area Network (LAN) is necessary. Where the WAN requires ongoing communication charges (i.e. GSM/GPRS), a WAN connection will not be available at all meters 102, or the cost of the WAN hardware is prohibitive, a LAN may be established between local vicinity collars 103 and other utility-related devices (such as load management devices, solid state thermostats, etc. (not shown)) to reduce the number of WAN end points (not shown) required in the network 105.

In one embodiment of system 100, a customer 101 of a utility service pre-pays for his utility services. This can be done in a form of a check, cash, credit card, ATM card, or other form of payment approved by the utility service. When a customer 101 pre-pays for his utility services, the billing server 106 stores data indicative of any unapplied payments. "Unapplied payments" refers to amounts that have been pre-paid but not yet applied to the customer's billing account.

Figure 2:
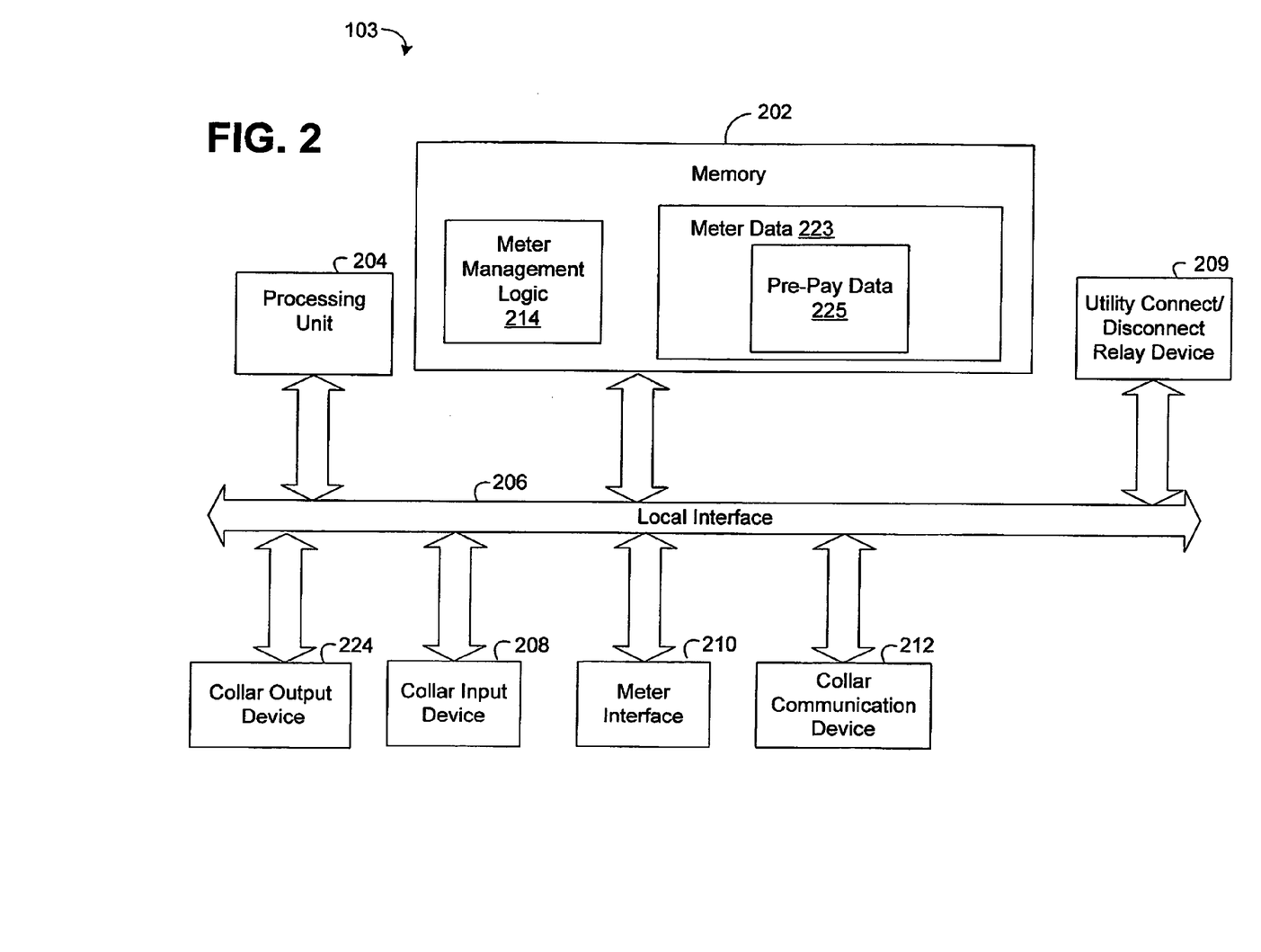
FIG. 2 depicts an exemplary collar of the system of FIG. 1.

FIG. 2 depicts an exemplary collar 103 of the present disclosure. The exemplary collar 103 generally comprises processing unit 204, collar output device 224, collar input device 208, meter interface 210 and collar communication device 212, all communicating over local interface 206. Collar 103 further comprises meter management logic 214, meter data 223, and pre-pay data 225. Meter management logic 214, meter data 223, and pre-pay data 225 can be software, hardware, or a combination thereof. In the exemplary collar 103, meter management logic 214, meter data 223, and pre-pay data 225 are shown as stored in memory 202. Memory may be of any suitable type of computer memory known in the art, such as RAM, ROM, flash-type, and the like.

As noted herein, meter management logic 214 and the meter data 223 are shown in FIG. 2 as software stored in memory 202. When stored in memory 202, the meter management logic 214 and the meter data 223 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Processing unit 204 may be a digital processor or other type of circuitry configured to run the meter management logic 214 by processing and executing the instructions of the meter management logic 214. Processing unit 204 communicates to and drives the other elements within the collar 103 via a local interface 206, which can include one or more buses. Furthermore, collar input device 208 provides a direct interface to collar components as may be required, for example, for troubleshooting purposes or to download firmware directly to processing unit 204. Collar input device 228 may be software, hardware, or a combination thereof.

In addition, collar output device 224, for example, a universal serial bus (USB) port or other type network device, connects the collar 103 with the network 105 for communication with the billing server 106 and/or data server 107 (FIG. 1).

Meter management logic 214 performs a daily read of the meter 102 via meter interface 210 and stores such meter data 223 obtained in memory 202. Meter interface 210 connects the collar 103 to meter 102, and may be software, hardware, or a combination thereof. Meter management logic 214 also downloads meter data 223 to the billing server 106 via communication device 212. Collar communication device 121 interfaces between the collar 103 and the network 105 and may comprise software, hardware, or a combination thereof. Collar communication device 212 may consist of, for example, a LAN radio, a WAN radio, an AMPS radio, or other devices suitable for connection to network 105.

Figure 3:
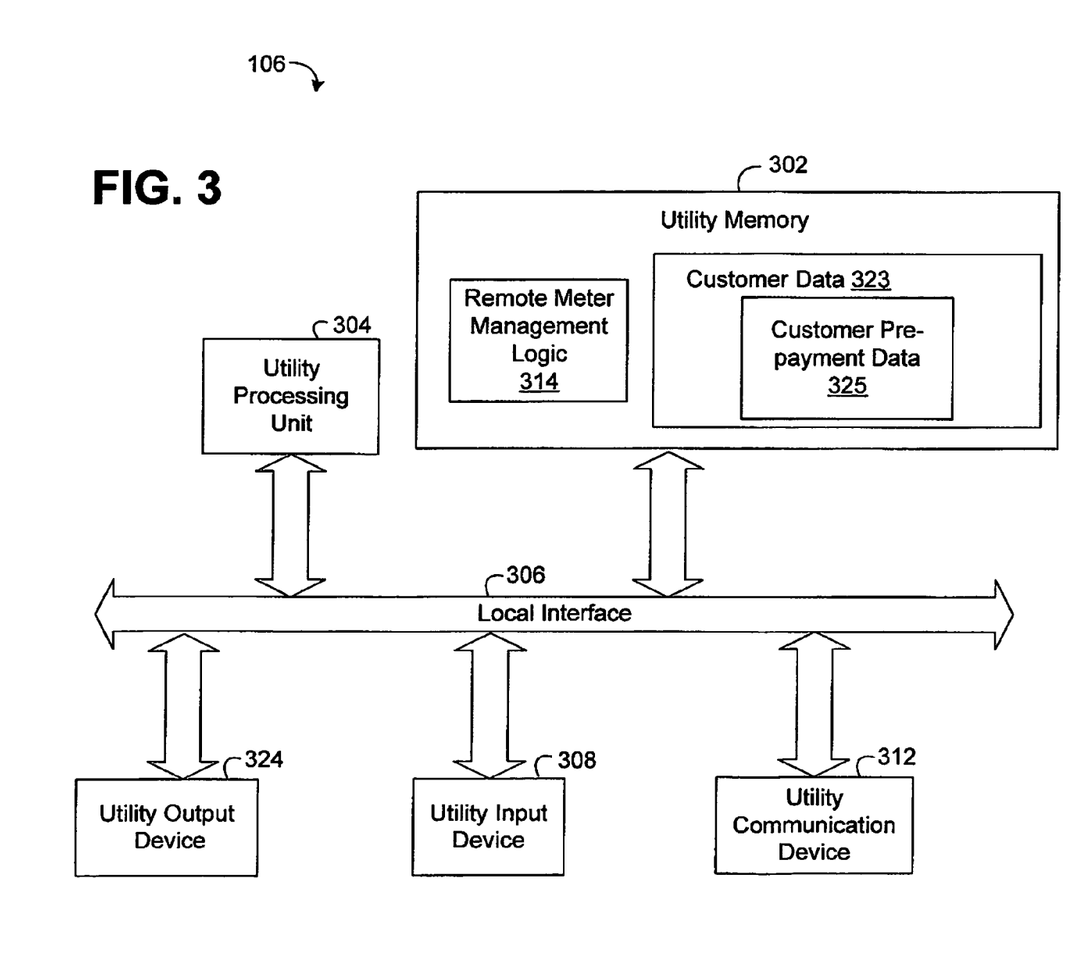
FIG. 3 depicts an exemplary billing server of the system of FIG. 1.
Figure 4:
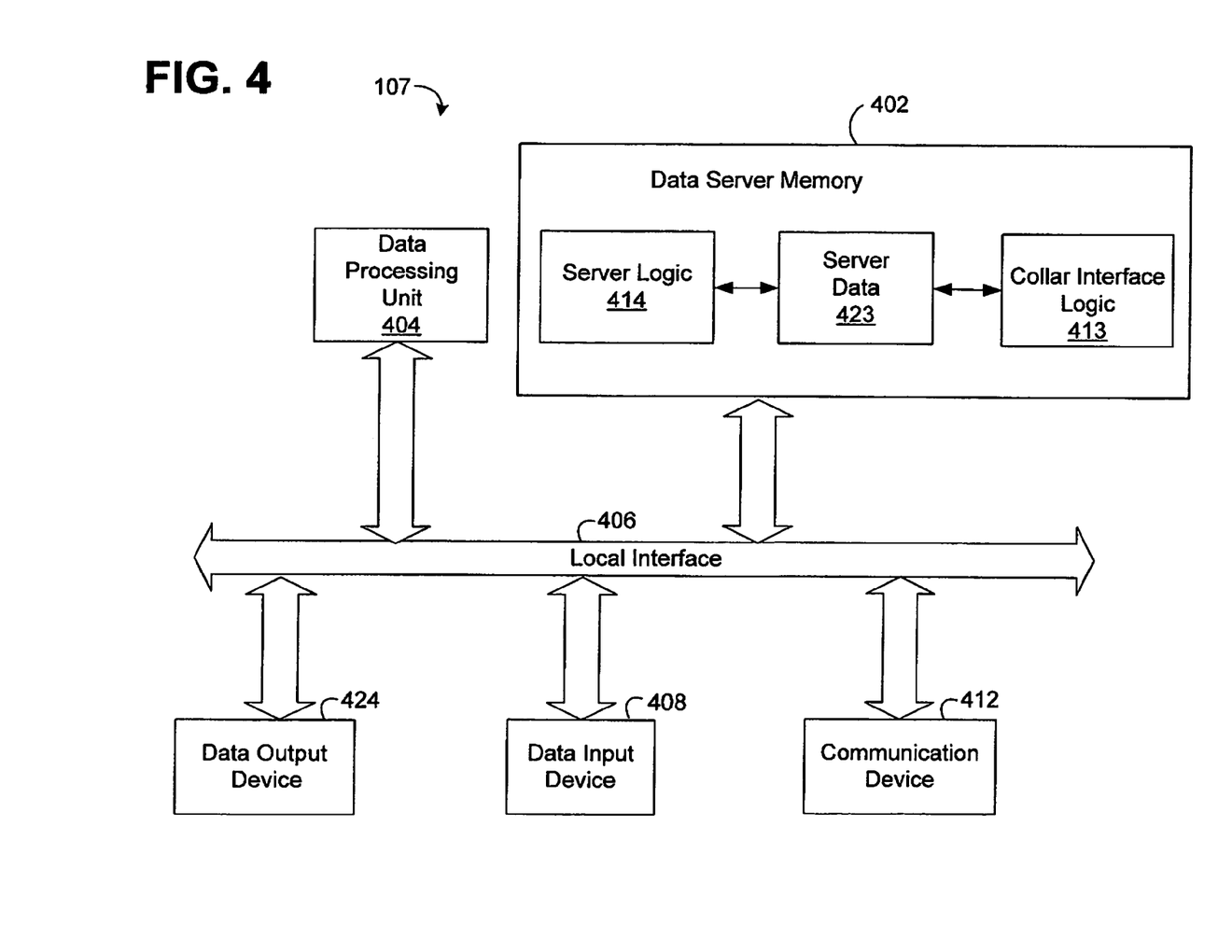
FIG. 4 depicts an exemplary data server of the system of FIG. 1.

Meter management logic 214 also retrieves customer data 323 [FIG. 3] and server data 423 [FIG. 4] from the billing server 106 across the network 105 via collar communication device 212. Meter management logic 214 further provides meter data 223 to other devices, such as the CIU 104 [FIG. 1], via output device 224, which may be software, hardware, or a combination thereof. CIU 104 provides end customers 101 with a display of CIU data 523 [FIG. 5]. In certain embodiments of the invention, customers may provide input to the utility service provider via the CIU 104, as is further discussed below. Output device 224 may comprise any number of communications mediums known in the art, for example a wireless solution such as ZigBee 802.11b or through power line carrier (PLC), or the like.

Meter management logic 214 also sends commands to utility connect/disconnect relay device 209, which connects and disconnects utility services to a premise (not shown) upon command from the utility service provider based upon its rules or automatically, as may be the case for a pre-pay customer whose credit has been exhausted. The utility has the flexibility to allow relay device 209 to perform the disconnection/reconnection functions automatically (via meter management logic 214) or with utility-based business rules. For example, if the weather is too cold or the individual is on a fixed income, the utility may the flexibility to elect to waive the automatic disconnection capability. Meter management logic may also be used to as a current limiting method to restrict usage to the customer 101 to a predetermined threshold level, either on a per-day total usage level or a real-time load level. If the customer 101 exceeds the predetermined threshold level, the meter management logic 214 would trigger the relay to disconnect the power. Utility connect/disconnect relay device 209 may be software, hardware, or a combination thereof.

Meter management logic 214 may also report power outages to the utility service provider, and may count and report any momentary power outages. Meter management logic 214 may also sample and log line voltage over time, so that voltage profile reports can be generated. The period of sampling, sampling rate, alarm thresholds, and repeat alarms are some of the parameters configurable by the utility.

Meter management logic 214 may also sample and log customer demand over time, so that user demand reports can be generated. The sampling period and sampling rate are some of the parameters configurable by the utility. Meter management logic 214 may also control customer 101 appliances and other powered devices (not shown) to reduce customer demand for the utility's or the customer's benefit. Control duration, bandwidth of control, override by the customer, and confirmation of device actions are some of the parameters configurable by the utility service provider.

Meter management logic 214 may also trigger alarms to third-party communications devices (not shown) including, but not limited, to cell phones, PDAs, computers, IVRs, pagers, and radios. Alarm events, alarm times, alarm formats, and alarm recipients are some of the parameters configurable by the utility service provider.

Meter management logic 214 may also detect customer tampering with utility equipment including the collar 103, and report to the utility service provider any such tampering. The utility service provider will define what parameters constitute tampering, alarms, and alarm recipients. Meter management logic 214 may also provide configurable system alarms and/or interfacing to customer-owned equipment.

Meter data 223 may comprise customer usage history, billing history, and other such data. In the embodiment of the invention illustrated in FIG. 2, meter data 223 further comprises pre-pay data 225. Pre-pay data 225 comprises payment history received from billing server 106. Pre-pay data 225 further comprises data indicative of the monthly calculated bill. Meter management logic 214 calculates a forward daily available power based upon the customer 101's credit balance, historical average daily usage, and daily average determinants. In some embodiments of the invention, meter management logic 214 also performs calculations such as calculation of the Forward Daily Available Power (FDAP), a calculation used in pre-pay applications, as discussed further herein. Meter management logic 214 allows a utility service provider to incorporate fixed monthly charges along with the actual usage by utilizing different rate structures to allocate these fixed charges on a daily basis based on the current day's rate tariff.

Collar 103 comprises a housing (not shown) with load carrying terminals that interface with the meter socket housing 108 and meter 102. Collar 103 may also comprise an optional battery, current measuring circuitry, and one or more antennas (not shown).

FIG. 3 depicts an exemplary billing server 106 of the present disclosure. The exemplary billing server 106 generally comprises utility processing unit 304, utility output device 324, utility input device 308, and utility communication device 312, all communicating over utility local interface 306. Billing server 106 further comprises remote meter management logic 314 and customer data 323, which can be software, hardware, or a combination thereof. In the exemplary billing server 106, remote meter management logic 314 and customer data 323 are shown as stored in memory 302.

The utility processing unit 304 may be a digital processor or other type of circuitry configured to run the remote meter management logic 314 by processing and executing the instructions of the remote meter management logic 314. The utility processing unit 304 communicates to and drives the other elements within the billing server 106 via a local interface 306, which can include one or more buses. Furthermore, a utility input device 308, for example, a keyboard, a switch, a mouse, and/or other type of interface, can be used to input data from a user (not shown) of the billing server 106.

In the exemplary billing server 106 of FIG. 3, the remote meter management logic 314 and customer data 323 are shown, as indicated hereinabove, as being implemented in software and stored in utility memory 302. However, remote meter management logic 314 and customer data 323 may be implemented in hardware, software, or a combination of hardware and software in other embodiments.

An exemplary utility input device 308 may include, but is not limited to, a keyboard device, serial port, scanner, camera, microphone, or local access network connection. An exemplary output device 324 may include, but is not limited to, a computer display.

Remote meter management logic 314 downloads customer data 323 from collar 103 via utility communication device 312 and stores such customer data 323 obtained in memory 302. Utility communication device 312 interfaces between the billing server 106 and the network 105 and may comprise software, hardware, or a combination thereof. Utility communication device 312 may consist of, for example, a LAN radio, a WAN radio, a universal serial bus (USB) port, or other devices suitable for connection to network 105.

In one embodiment, remote meter management logic 314 is software written with "web services." "Web services" refers to an open standard based web application. A web services application can communicate over the internet with another web services application using a standard XML messaging system.

Remote meter management logic 314 also receives meter data 223 [FIG. 2] and server data 423 [FIG. 4] from the collar 103 and remote data server 107, respectively, across the network 105 via utility communication device 312. Remote meter management logic 314 transmits customer balances and other customer data 323 across the network 105 via utility communication device 312. Remote meter management logic 314 also transmits customer balances and other customer data 323 to other devices, such as utility GUI's (not shown) via utility output device 324, which may be software, hardware, or a combination thereof. Output device 324 may comprise any number of communications mediums known in the art. Remote meter management logic 314 creates and maintains customer accounts for the utility and monitors the monetary balances for each customer.

Customer data 323 can comprise customer pre-payment data 325. Pre-payment data comprises, for example, data indicative of amounts pre-paid by a customer, usage history billing information. Customer data 323 can further comprise the customer name, account number, usage data, and the like.

FIG. 4 depicts an exemplary data server 107 according to the present invention. Data server 107 generally comprises data processing unit 404, server logic 414, server data 423, and collar interface logic 413. The data processing unit 404 may be a digital processor or other type of circuitry configured to run the server logic 414 by processing and executing the instructions of the server logic 414. The data processing unit 404 communicates to and drives the other elements within the data server 107 via a local interface 406, which can include one or more buses. Furthermore, a data input device 408, for example, a keyboard, a switch, a mouse, and/or other type of interface, can be used to input data from a user (not shown) of the data server 107.

Server data 423 comprises data describing characteristics of at least one meter 102 [FIG. 1]. For example, server data 423 may comprise meter configuration information, data indicative of real-time meter reads, or status of the meters. Server data 423 comprises real-time meter read data indexed by the particular meter(s) read.

In the exemplary data server 107 of FIG. 4, the server logic 414, server data 423, and collar interface logic 413 are shown, as indicated hereinabove, as being implemented in software and stored in utility memory 402. However, server logic 414, server data 423, and collar interface logic 413 may be implemented in hardware, software, or a combination of hardware and software in other embodiments. In one embodiment, server logic 414 is software stored in memory 402. Notably, server logic 414 can also be a web service application as described above with reference to FIG. 3.

Server logic 414 manages data flow between the collar 103 and the billing server 106. In addition, the server logic 414 manages data flow from the access device 109 and the collar 103. The data server 107 further comprises collar interface logic 413. In one embodiment, collar interface logic 413 as shown is software stored in memory 402.

During operation, the server logic 414 receives from the billing server 106 a request for a meter read. The server logic 414 stores data in server data 423 indicative of the read request. When such data is stored in server data 423, the collar interface logic 413 transmits a request to the collar 103 [FIG. 1] requesting a real-time meter read. The collar 103 transmits data indicative of a meter read to the collar interface logic 413 via communication device 412. Communication device 412 may be a modem, T1 line, router, wireless communication device, or the like. Upon receipt of the real-time meter read, the collar interface logic 413 stores data indicative of the real-time meter read in server data 423. Server logic 414 transmits real-time meter read to the billing server 106. Collar interface logic 413 translates communications between the collar 103 and the server logic 414.

In addition to doing meter reads, the server logic 414 downloads data indicative of payment history corresponding to a customer to the collar 103.

An exemplary data input device 408 may include, but is not limited to, a keyboard device, serial port, scanner, camera, microphone, or local access network connection. An exemplary data output device 424 may include, but is not limited to, a computer display.

Figure 5:
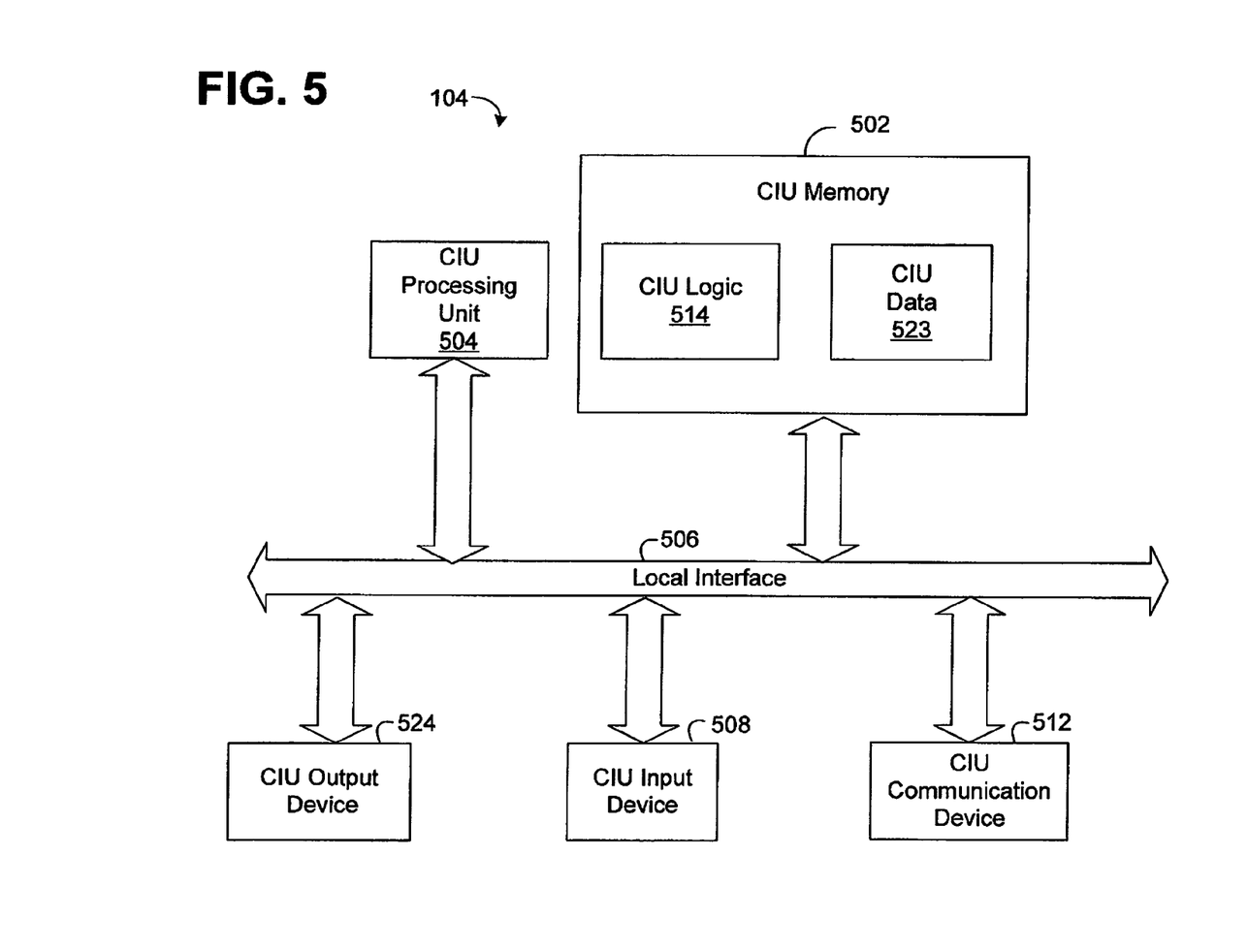
FIG. 5 depicts an exemplary customer interface unit of the system of FIG. 1.

FIG. 5 depicts an exemplary CIU 104 of the present disclosure. The exemplary CIU 104 generally comprises CIU processing unit 504, CIU output device 524, CIU input device 508, and CIU communication device 512, all communicating over utility local interface 506. CIU 104 further comprises CIU logic 514 and CIU data 523, which can be software, hardware, or a combination thereof. In the exemplary CIU 104, CIU logic 514 and CIU data 523 are shown as stored in memory 502.

The CIU processing unit 504 may be a digital processor or other type of circuitry configured to run the CIU logic 514 by processing and executing the instructions of the CIU logic 514. The CIU processing unit 504 communicates to and drives the other elements within the CIU 104 via a local interface 506, which can include one or more buses. Furthermore, a CIU input device 508, for example, a keypad, a switch, a mouse, and/or other type of interface, can be used to input data from a customer 101 [FIG. 1]. In addition, communication device 512 connects the CIU 104 with the collar 103 for communication with the collar 103 and/or data server 107 (FIG. 1).

In the exemplary CIU 104 of FIG. 5, the CIU logic 514 and CIU data 523 are shown, as indicated hereinabove, as being implemented in software and stored in CIU memory 502. However, CIU logic 514 and CIU data 523 may be implemented in hardware, software, or a combination of hardware and software in other embodiments.

CIU logic 514 downloads CIU data 523 from collar 103 via utility communication device 512 and stores such CIU data 323 obtained in memory 502. CIU communication device 512 interfaces between the CIU 104 and the collar 103 and may comprise software, hardware, or a combination thereof.

CIU communication device 512 may comprise any number of communications mediums known in the art, for example a wireless solution such as ZigBee 802.11b or through power line carrier (PLC), or the like.

The CIU data 523 may include metering information such as voltage and current information, power quality information including voltage transients, harmonics, power factor analysis, energy usage information and anticipated energy consumption over a specified time period in the future or historical consumption in the past. The CIU data 523 may also consist of messages to the customer 101 regarding its pre-pay usage, such as how many days of power remain, or that a power disconnect is pending.

An exemplary CIU input device 508 may include, but is not limited to, a keyboard device, keypad, touch screen, switch, serial port, scanner, camera, microphone, web portal, cellular telephone, wireless personal digital assistant, or local access network connection. In some embodiments of the invention, customer 101 may input certain information into the input device 508, such as an acknowledgement of a message received from the utility. An exemplary output device 524 may include, but is not limited to, a computer display, an LCD, a cellular phone or wireless display device (such as a personal digital assistant (PDA)) for displaying text messages.

Figure 6:
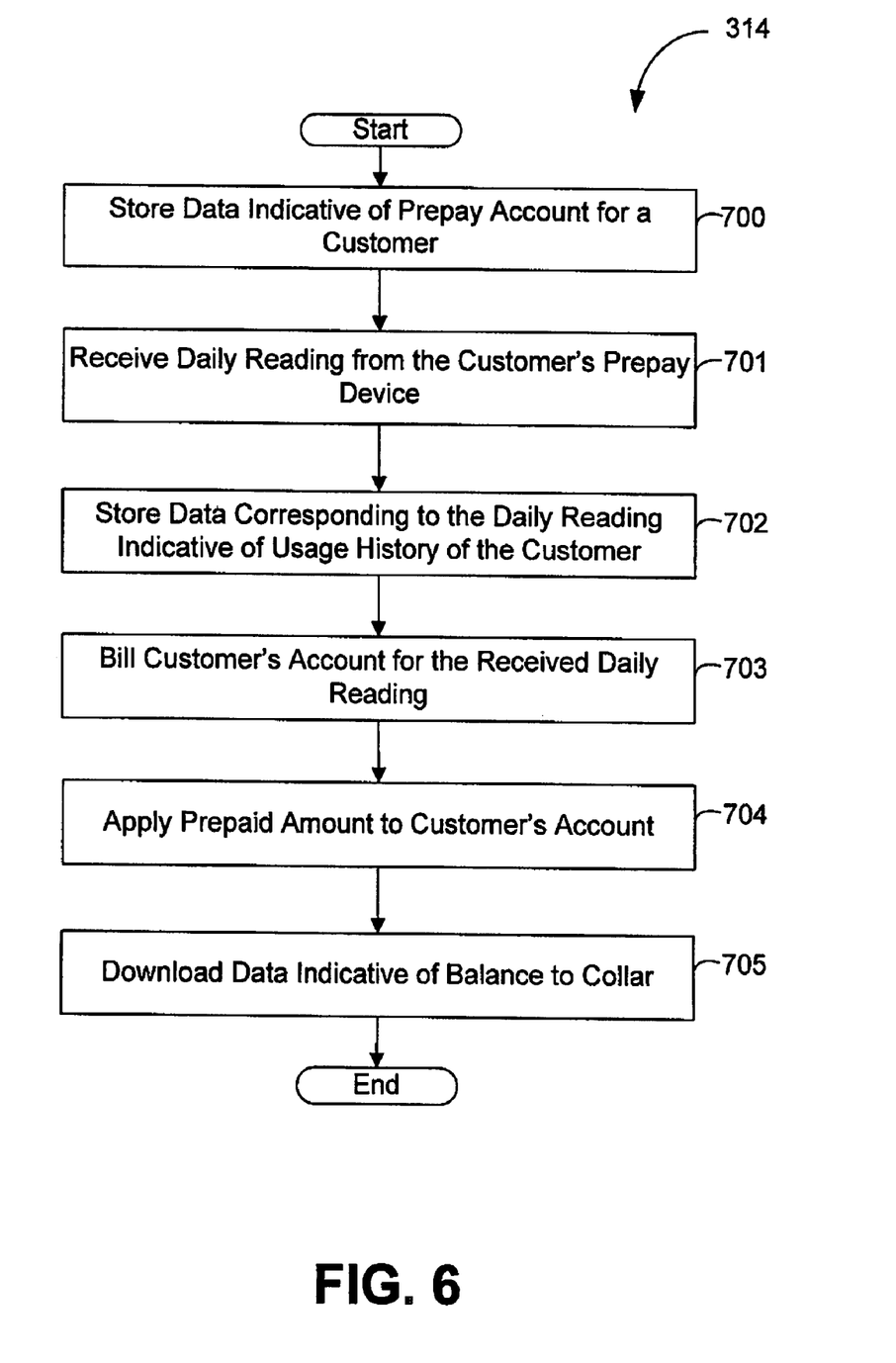
FIG. 6 is a flow chart illustrating exemplary architecture and functionality of the remote meter management logic of FIG. 3.

FIG. 6 is a flowchart that depicts exemplary architecture and functionality of the remote meter management logic 314 [FIG. 3]. Referring to step 700, the remote meter management logic 314 stores data indicative of a pre-pay account for a customer. In step 701, the remote meter management logic 314 receives a daily reading from the customer's pre-pay device. In step 702, the remote meter management logic 314 stores data corresponding to the daily reading indicative of the customer's usage history. In step 703, the remote meter management logic 314 bills the customer's account for the received daily reading. In step 704, the remote meter management logic 314 applies the pre-paid amount to the customer's account. In step 705, the remote meter management logic 314 downloads data indicative of the remaining balance to the collar 103.

Figure 7:
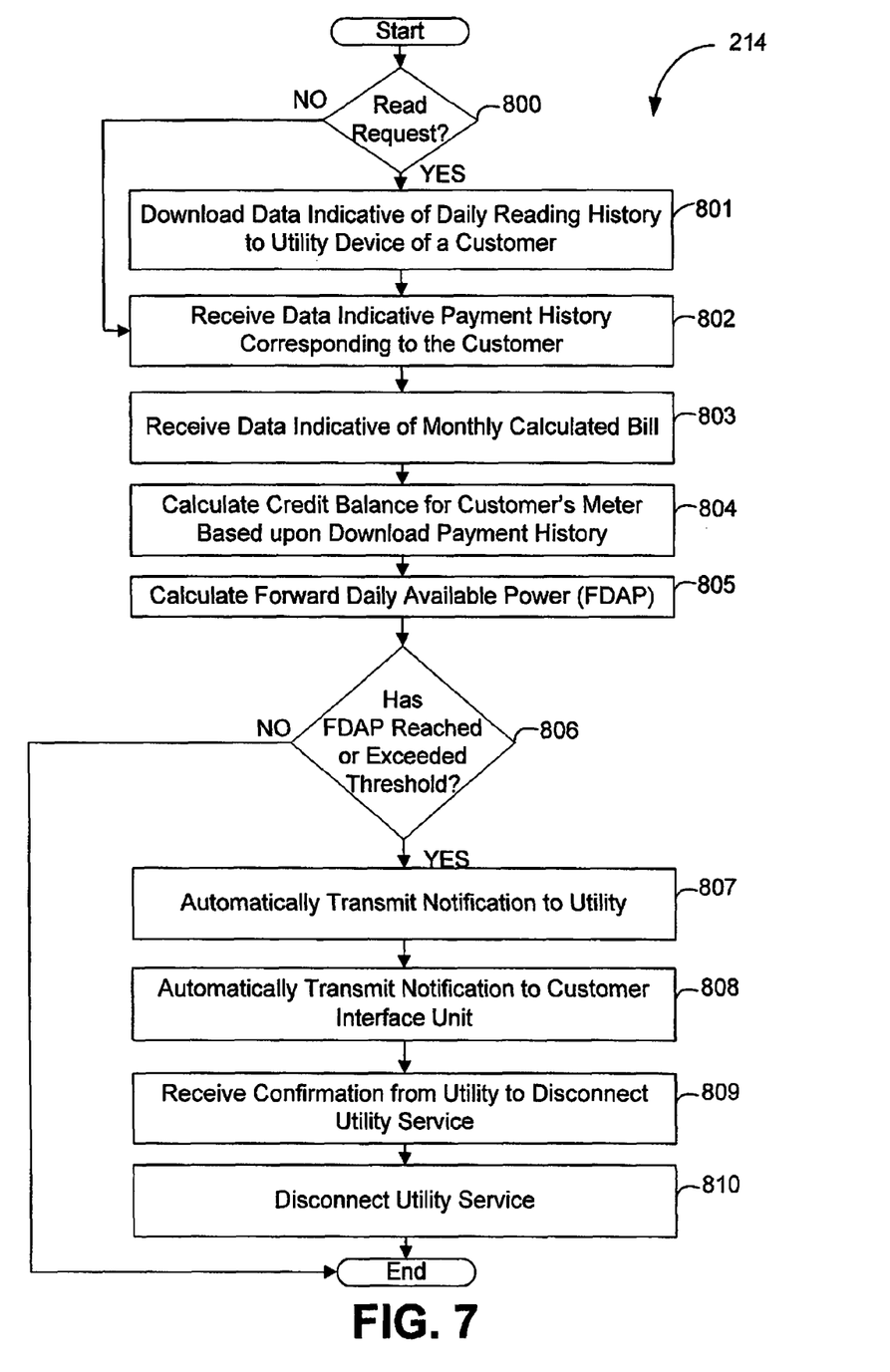
FIG. 7 is a flow chart illustrating exemplary architecture and functionality of the meter management logic of FIG. 2.

FIG. 7 is a flowchart that depicts exemplary architecture and functionality of the meter management logic 214 [FIG. 2]. Referring to step 800, the meter management logic 214 may receive a read request from the utility service company (not shown). If a read request is received, the meter management logic 214 downloads data indicative of a daily reading history, as shown in step 801. Referring to step 802, the meter management logic 214 receives data indicative of a customer's payment history. Next, in step 803, the meter management logic 214 receives data indicative of the customer's monthly calculated bill. In step 804, the meter management logic 214 calculates the credit balance for the customer's meter based upon the downloaded payment history. The meter management logic 214 then calculates the Forward Daily Available Power (FDAP), as shown in step 805. In step 806, if the FDAP has reached or exceeded a predetermined threshold, the meter management logic 214 automatically transmits a notification to the utility (step 807) and the CIU (step 808). Upon receipt of a confirmation from the utility to disconnect the utility service (step 809), the meter management logic 214 disconnects the utility service (step 810).

In some embodiments of the invention, the meter management logic 214 carries out procedures of certain utility service providers to provide advance notice(s) to the customer of an impending service disconnect, and such notice(s) may be displayed on the CIU 104. Further, some utility service providers require customers to acknowledge an impending service disconnect, and customers may use the CIU 104 [FIG. 5] to provide such an acknowledgement, for example, via a CIU 104 input device 508, such as by pressing a button (not shown) on the CIU 104.

Figure 8:
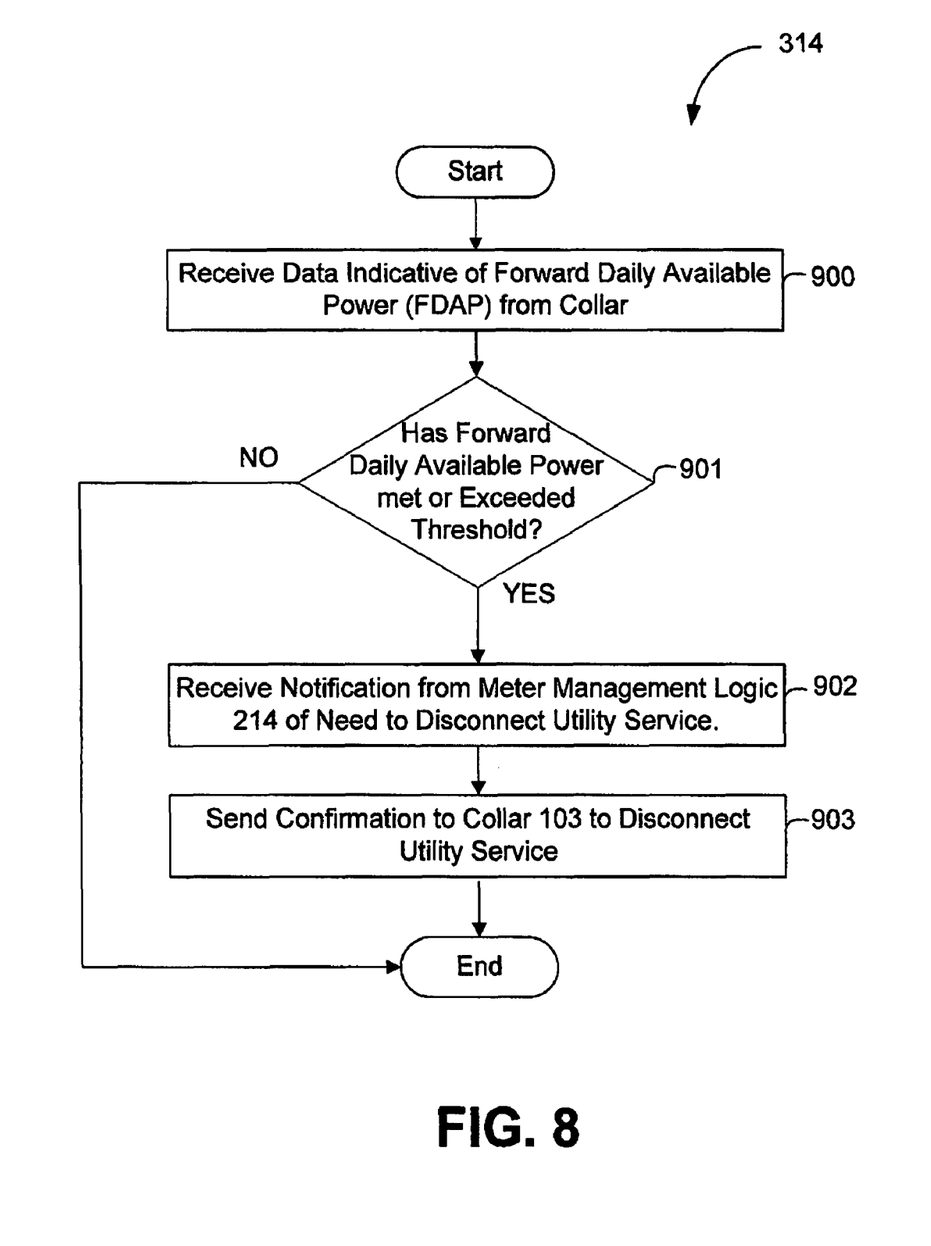
FIG. 8 is a flow chart illustrating alternative exemplary architecture and functionality of the remote meter management logic of FIG. 3.

FIG. 8 is a flowchart that depicts exemplary architecture and functionality of the remote meter management logic 314 [FIG. 3]. Referring to step 900, the remote meter management logic 314 receives data indicative of the FDAP from the collar 103 [FIG. 1]. If the FDAP exceeds or meets a threshold value, as shown in step 901, the remote meter management logic 314 will receive a notification from meter management logic 214 [FIG. 7]. The remote meter management logic 314 will then send a confirmation to the collar 103 to disconnect the utility service (step 903).

Figure 9:
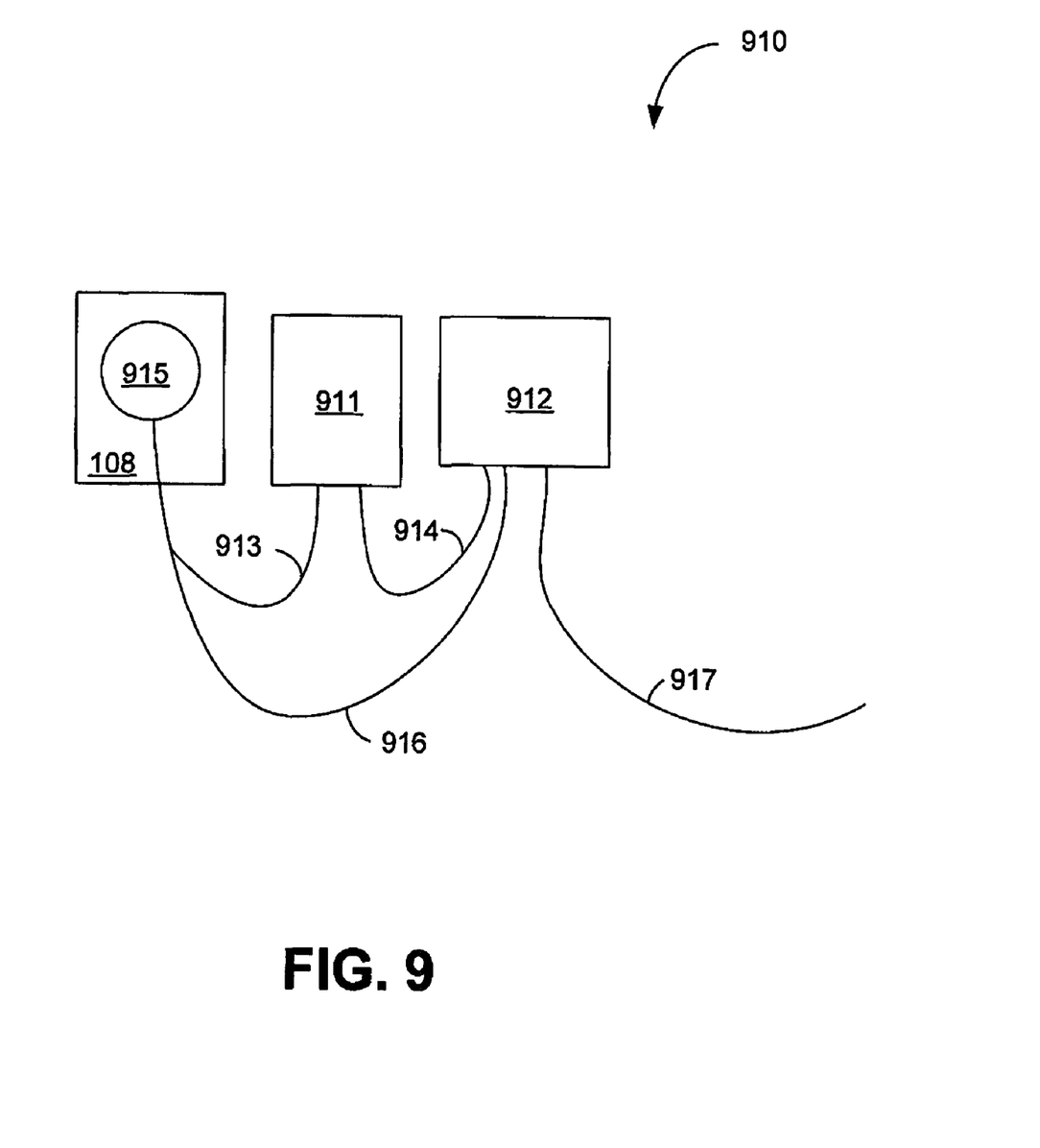
FIG. 9 depicts an exemplary embodiment of the invention in a wired Ethernet version.

As illustrated in FIG. 9, the present invention can also be configured in as a wired Ethernet system 910 which has a collar 915 comprising an internal power supply (not shown) capable of supplying both the collar 915's own power requirements as well as providing a power output 913 capable of supplying a fiber conversion unit 912 and/or its associated backup battery 911. Referring to FIG. 9, the fiber conversion unit 912 is wired with an Ethernet cable 916 to collar 915. The Ethernet fiber from the service provider 917 interfaces with the fiber conversion unit 912. This configuration allows the fiber service provider (not shown) to gain the necessary power supply and provide communications for utility based applications from one collar 103. Alternatively, the power supply (not shown) in collar 915 can supply power directly to the fiber conversion unit 912 if a battery backup 911 is not utilized.

In addition to the embodiments described herein, the present invention may also be in the form of a utility meter 102 with all of the features of the present invention that are described as residing in collar 103 instead incorporated into the utility meter 102.

This invention may be provided in other specific forms and embodiments without departing from the essential characteristics as described herein. The embodiment described is to be considered in all aspects as illustrative only and not restrictive in any manner.

As described above and shown in the associated drawings and exhibits, the present invention comprises a collar-based system and method for controlling a utility meter. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A system to control a utility meter comprising:
   a collar unit coupled to the utility meter; and
   a display unit communicatively coupled to the collar unit to display customer utility data corresponding to the utility meter;
   said collar unit configured to mount between said meter and a meter base, said collar unit configured to electrically couple said meter to said meter base, said collar unit adapted to mount on said meter base and said collar unit adapted to mount said meter on said collar unit;
   said collar unit configured to receive utility power from a power provider through a first connection between said collar unit and said meter base and to provide said power to said meter, said collar unit configured to receive measured power from said meter and to provide said measured power to a consumer premises through a second connection between said collar unit and said meter base;

said collar unit configured to receive measurement information relating to said measured power from said meter;

said collar unit comprising a power supply connected to said utility power and configured to supply auxiliary power to external communications equipment through an auxiliary power connection to said collar unit, said auxiliary power connection separate from said first connection and said second connection; said auxiliary power not conducted through said second connection; said external communications equipment being disposed external to said collar unit;

said collar unit having a network interface for network communications with a data server for said power provider; said collar unit configured to receive commands through said external communications equipment from said data server and said collar unit configured to provide said measurement information through said external communications equipment to said data server;

said collar unit comprising a relay configured for connection and disconnection of said measured power to said consumer premises in response to said commands received through said external communications equipment; and said system comprising a backup battery to provide power to said collar unit and said external communications equipment; said backup battery connected to said collar unit through said auxiliary power connection.

2. The system of claim 1, wherein the customer utility data comprises data indicative of at least one of a group consisting of: real-time power readings, real-time voltage readings, real-time current readings, and real-time power factor readings.

3. The system of claim 1, wherein the customer utility data comprises data indicative of power quality.

4. The system of claim 1, wherein the customer utility data comprises data indicative of energy usage.

5. The system of claim 4, wherein the data indicative of energy usage is identified for at least one appliance.

6. The system of claim 1, wherein the customer utility data comprises data indicative of customer billing data.

7. The system of claim 1, wherein the customer utility data comprises data indicative of anticipated energy consumption over time period.

8. The system of claim 1, wherein the collar further comprises an internal communication device.

9. The system of claim 8, wherein the display unit is configured to display a message in the form of at least one of the following: a video display, a digital display, text message, an e-mail, or a web portal.

10. The system of claim 9, wherein the display unit is remote to the collar and the internal communication device is configured to transmit the customer utility data to the display unit.

11. The system of claim 1, wherein the collar unit further comprises logic to collect customer utility data from the utility meter.

12. The system of claim 1, wherein the collar unit further comprises logic to calculate customer utility data from the utility meter.

13. The system as recited in claim 1, wherein said external communications equipment comprises a network data converter.

14. The system as recited in claim 13, wherein said network data converter is a fiber optic data converter.

15. The system as recited in claim 13, wherein said external communications equipment is coupled to said collar unit using Ethernet®.

16. The system as recited in claim 1, further including said utility meter.

17. The system as recited in claim 1, further including said meter base.

18. A method for controlling a utility meter, comprising the steps of:

providing a collar unit for mounting between said meter and a meter base, adapting said collar unit for electrically coupling said meter to said meter base, adapting said collar unit for mounting on said meter base and adapting said collar unit for mounting said meter on said collar unit;

said collar unit receiving utility power from a power provider through a first connection between said collar unit and said meter base and providing said utility power to said meter, said collar unit receiving measured power from said meter and providing said measured power to a consumer premises through a second connection between said collar unit and said meter base;

said collar unit receiving at least one reading from said utility meter;

transmitting data indicative of the reading from said collar unit to a customer display unit; and displaying the data by using the customer display unit;

said collar unit comprising a power supply connected to said utility power and configured for supplying auxiliary power to external communications equipment through an auxiliary power connection to said collar unit, said auxiliary power connection separate from said first connection and said second connection; said auxiliary power not conducted through said second connection;, said external communications equipment being disposed external to said collar unit;

said collar unit having a network interface for network communications with a data server for said power provider; said collar unit receiving commands through said external communications equipment from said data server and said collar unit providing said measurement information through said external communications equipment to said data server;

said collar unit comprising a relay configured for connection and disconnection of said measured power to said consumer premises in response to said commands received through said external communications equipment; and said system comprising a backup battery for providing power to said collar unit and said external communications equipment; said backup battery connected to said collar unit through said auxiliary power connection.

19. The method of claim 18, further comprising the step of calculating customer utility data based upon the reading received from the utility meter.

20. The method of claim 19, wherein the calculating step further comprises the step of calculating data indicative of power quality.

21. The method of claim 19, wherein the calculating step further comprises the step of calculating data indicative of energy usage.

22. The method of claim 19, further comprising the steps of:

transmitting the customer utility data to the customer display unit; and displaying the customer utility data by using the customer display unit.

23. The method of claim 18, wherein the transmitting step further comprises the step of transmitting energy usage data indicative of energy consumed by at least one appliance.

24. The method of claim 23, wherein the displaying step further comprises the steps of:
displaying the energy usage data indicative of energy consumed by the appliance; and
identifying the data with the appliance.

25. The method of claim 18, wherein the transmitting step further comprises transmitting the data wirelessly to the customer display unit.

26. The method of claim 18, wherein the transmitting step further comprises transmitting the data to the customer display unit via a power line carrier.

27. The method of claim 18, wherein the customer display unit displays a message in the form of at least one of the following: a digital display, a video display, a text message, an e-mail, or a web portal.

28. A system, comprising:
a collar unit communicatively coupled to a utility meter; and
a billing server communicatively coupled to the collar unit via a network, wherein the collar unit is configured to transmit customer utility data to the billing server;
said collar unit for mounting between said meter and a meter base, said collar unit for electrically coupling said meter to said meter base, said collar unit adapted to mount on said meter base and said collar unit adapted to mount said meter on said collar unit;
said collar unit configured to receive utility power from a power provider through a first connection between said collar unit and said meter base and to provide said utility power to said meter, said collar unit configured to receive measured power from said meter and to provide said measured power to a consumer premises through a second connection between said collar unit and said meter base;
said collar unit configured to receive measurement information relating to said measured power from said meter;
said collar unit comprising a power supply connected to said utility power and configured to supply auxiliary power to external communications equipment through an auxiliary power connection to said collar unit, said auxiliary power connection separate from said first connection and said second connection; said auxiliary power not conducted through said second connection; said external communications equipment being disposed external to said collar unit;
said collar unit having a network interface for communications over said network with said billing server for said utility; said collar unit configured to receive commands through said external communications equipment from said billing server and said collar unit configured to provide said measurement information through said external communications equipment to said billing server;
said collar unit comprising a relay configured for connection and disconnection of said measured power to said consumer premises in response to said commands received through said external communications equipment; and
said system comprising a backup battery to provide power to said collar unit and said external communications equipment; said backup battery connected to said collar unit through said auxiliary power connection.

29. The system of claim 28, wherein said collar unit is configured to receive a request for customer utility data from said billing server.

30. The system of claim 28, wherein the collar unit is configured to automatically transmit the customer utility data to the billing server.

31. The system of claim 28, wherein the collar unit comprises logic configured to calculate a forward daily available power (FDAP).

32. A system comprising:
a network;
a collar unit communicatively coupled to a utility meter;
means for receiving payment data indicative of a payment via the network;
means for storing the payment data in memory via said collar unit communicatively coupled to said utility meter; and
means for calculating, based upon the payment data, an amount of power available corresponding to said utility meter;
said collar unit for mounting between said meter and a meter base, said collar unit for electrically coupling said meter to said meter base, said collar unit adapted to mount on said meter base and said collar unit adapted to mount said meter on said collar unit;
said collar unit configured to receive utility power from a power provider through a first connection between said collar unit and said meter base and to provide said utility power to said meter, said collar unit configured to receive measured power from said meter and to provide said measured power to a consumer premises through a second connection between said collar unit and said meter base;
said collar unit configured to receive measurement information relating to said measured power from said meter;
said collar unit comprising a power supply connected to said utility power and configured to supply auxiliary power to external network communications equipment through an auxiliary power connection to said collar unit, said auxiliary power connection separate from said first connection and said second connection; said auxiliary power not conducted through said second connection; said external communications equipment being disposed external to said collar unit;
said collar unit configured to receive said payment data over said network through said external network communications equipment;
said collar unit comprising a relay configured for connection and disconnection of said measured power to said consumer premises in response to said commands received through said external communications equipment; and
said system comprising a backup battery to provide power to said collar unit and said external communications equipment; said backup battery connected to said collar unit through said auxiliary power connection.

33. The system of claim 32, further comprising:
logic configured to activate the relay upon receipt of data indicative of a notification from the network that the amount of power available has reached a threshold value.

* * * * *